US008126262B2

(12) United States Patent
Kender

(10) Patent No.: US 8,126,262 B2
(45) Date of Patent: Feb. 28, 2012

(54) ANNOTATING VIDEO SEGMENTS USING FEATURE RHYTHM MODELS

(75) Inventor: John R. Kender, Leonia, NJ (US)

(73) Assignee: International Business Machines Corporation, Armonk, NY (US)

( * ) Notice: Subject to any disclaimer, the term of this patent is extended or adjusted under 35 U.S.C. 154(b) by 966 days.

(21) Appl. No.: 11/764,473

(22) Filed: Jun. 18, 2007

(65) Prior Publication Data
US 2008/0310709 A1 Dec. 18, 2008

(51) Int. Cl.
G06K 9/62 (2006.01)
G06K 9/46 (2006.01)
G06K 3/00 (2006.01)
G05B 13/02 (2006.01)
G06F 15/18 (2006.01)
G06E 1/00 (2006.01)
H04N 5/14 (2006.01)

(52) U.S. Cl. .......... 382/156; 382/159; 382/190; 700/47; 715/723; 706/12; 706/20; 348/700

(58) Field of Classification Search .......... 382/156, 382/159, 190; 715/723; 706/12, 20; 700/47; 348/700
See application file for complete search history.

(56) References Cited

U.S. PATENT DOCUMENTS

| 5,566,270 | A * | 10/1996 | Albesano et al. ............ 704/232 |
| 5,883,986 | A * | 3/1999 | Kopec et al. ............ 382/310 |
| 6,041,142 | A * | 3/2000 | Rao et al. ............ 382/232 |
| 6,072,542 | A * | 6/2000 | Wilcox et al. ............ 348/722 |
| 6,327,581 | B1 * | 12/2001 | Platt ............ 706/12 |
| 6,526,170 | B1 * | 2/2003 | Matsumoto ............ 382/187 |
| 6,754,389 | B1 * | 6/2004 | Dimitrova et al. ............ 382/224 |
| 6,865,226 | B2 * | 3/2005 | Xie et al. ............ 375/240.08 |
| 6,931,595 | B2 * | 8/2005 | Pan et al. ............ 715/723 |
| 7,310,589 | B2 * | 12/2007 | Li ............ 702/179 |
| 7,313,185 | B2 * | 12/2007 | Ma et al. ............ 375/240.16 |
| 7,313,269 | B2 * | 12/2007 | Xie et al. ............ 382/159 |
| 7,545,954 | B2 * | 6/2009 | Chan et al. ............ 382/103 |
| 7,657,102 | B2 * | 2/2010 | Jojic et al. ............ 382/224 |
| 7,729,510 | B2 * | 6/2010 | Zakrzewski et al. ............ 382/100 |
| 7,873,982 | B2 * | 1/2011 | Smith et al. ............ 725/136 |
| 2001/0044719 | A1 * | 11/2001 | Casey ............ 704/245 |
| 2002/0028021 | A1 * | 3/2002 | Foote et al. ............ 382/224 |

(Continued)

OTHER PUBLICATIONS

Altun, "Hidden Markov Support MAchines" 2003, Proceeedings of the Twentieth international conference on machien learning, pp. 1-8.*

(Continued)

Primary Examiner — Kathleen Y Dulaney
(74) Attorney, Agent, or Firm — Brian P. Verminski; Ryan, Mason & Lewis, LLP

(57) ABSTRACT

Each video segment in a plurality of video segments is annotated with an indicator of the likelihood that the respective video segment shows a particular feature. The plurality of video segments forms an episode of interest from a given video domain. Initial feature probabilities are calculated for respective ones of the plurality of video segments using a machine learning algorithm. Each initial feature probability indicates the likelihood that its respective video segment shows the particular feature. Refined feature probabilities are determined for respective ones of the plurality of video segments by finding the most probable state sequence in a finite state machine. This is accomplished at least in part using the determined initial feature probabilities. Finally, each of the video segments in the plurality of vides segments is annotated with its respective refined feature probability.

20 Claims, 6 Drawing Sheets

U.S. PATENT DOCUMENTS

| | | | |
|---|---|---|---|
| 2002/0080162 A1* | 6/2002 | Pan et al. | 345/723 |
| 2003/0190074 A1* | 10/2003 | Loudon et al. | 382/187 |
| 2004/0221237 A1* | 11/2004 | Foote et al. | 715/700 |
| 2005/0131869 A1* | 6/2005 | Xie et al. | 707/3 |
| 2005/0231635 A1* | 10/2005 | Lin | 348/441 |
| 2005/0285933 A1* | 12/2005 | Rui et al. | 348/14.03 |
| 2007/0154088 A1* | 7/2007 | Goh et al. | 382/167 |
| 2007/0263900 A1* | 11/2007 | Medasani et al. | 382/103 |
| 2007/0300249 A1* | 12/2007 | Smith et al. | 725/19 |
| 2010/0005485 A1* | 1/2010 | Tian et al. | 725/32 |

OTHER PUBLICATIONS

P. Duygulu et al., "Towards Auto-documentary: Tracking the Evolution of News Stories," in Proceedings of the ACM International Conference on Multimedia (ACMMM'04), Oct. 2004, pp. 820-827.

B. Adams et al., "Study of Shot Length and Motion as Contributing Factors to Movie Tempo," in Proceedings of the ACM International Conference on Multimedia (ACMMM,'00), Oct. 2000, pp. 353-355.

B. Adams et al., "Study of Shot Length and Motion as Contributing Factors to Movie Tempo" in Proceedings of the ACM International Conference on Multimedia (ACMMM,'00), Oct. 2000, pp. 353-355.

P. Duygulu et al., "Towards Auto-Documentary: Tracking the Evolution of News Stories," in Proceedings of the ACM International Conference on Multimedia (ACMMM'04), Oct. 2004, pp. 820-827.

J. C. Platt, "Probabilistic Outputs for Support Vector Machines and Comparisons to Regularized Likelihood Methods," in Advances in Large Margin Classifiers, Peter J. Bartlett et al., Eds., chapter 5, pp. 61-74. MIT Press, Oct. 2000.

B. Zadrozny et al., "Transforming Classifier Scores into Accurate Multiclass Probability Estimates," in Proceedings of the ACM International Conference on Knowledge Discovery and Data Mining (KDD'02), Jul. 2002, pp. 694-699.

A. G. Hauptmann, "Towards a Large Scale Concept Ontology for Broadcast Video," in Proceedings of Third International Conference on Image and Video Retrieval (CIVR'04), Jul. 2004, pp. 674-675, Springer-Verlag.

* cited by examiner

ANNOTATING VIDEO SEGMENTS USING FEATURE RHYTHM MODELS

GOVERNMENT RIGHTS

This invention was made with Government support under Contract No: 2004-H839800-000 awarded by ARDA—Advanced Research and Development Activity. The Government has certain rights in this invention.

FIELD OF THE INVENTION

The present invention is directed generally to video annotation, and, more particularly, to the automatic annotation of visual features in video segments.

BACKGROUND OF THE INVENTION

Video stories such as those found in the video news domain typically are reported as separate episodes reported over time and over different channels, with each episode comprising a sequence of related video segments and each video segment comprising video imagery taken from a particular vantage point. A first step to the effective indexing and retrieval of all related episodes across all times and all channels is the automatic annotating of their individual video segments with feature labels that describe the visual features shown in the video segments. A number of efforts have been made to derive and evaluate visual feature ontologies for use in labeling video segments. Perhaps the most well-developed ontology is the Large Scale Concept Ontology for Multimedia Understanding (LSCOM) described in, for example, A. G. Hauptman, "Towards a Large Scale Concept Ontology for Broadcast Video," *Proceedings of International Conference on Image and Video Retrieval*, July 2004, pp. 674-675.

Nevertheless, the automatic annotation of video segments with feature labels remains inexact. One method of measuring the precision of such labeling is Average Precision (AP). AP is defined as the average of the instantaneous precisions of a sequence of experiments. Each experiment retrieves new candidate video segments one by one until a new correctly labeled segment is found. What is considered correct is determined by reference to feature labels manually assigned to the video segments by one or more persons who have previously viewed the video segments. Instantaneous precision is then defined as the number of correctly labeled video segments (which increases by exactly one at each step) divided by the total retrievals in all experiments so far (which includes all the errors of this and all prior experiments). Early errors of retrieval therefore continue to severely penalize subsequent experiments. Some visual features, such as "Person," "Face," and "Outdoor" can be detected in isolated video segments with much greater than 90% AP. However, AP quickly drops as features become less common, in part because less training data is available. For example, the AP for "Building" is typically less than 50%, and most of the rarer visual features, such "Police-Security" or "Prisoner," typically have an AP in the low single digits.

As a result, there is a need for methods and apparatus for improving precision in the automatic annotation of video segments with feature labels that indicate the visual features shown in the video segments.

SUMMARY OF THE INVENTION

Embodiments of the present invention address the above-identified need by improving the automatic annotation of video segments with feature labels at least in part by selectively reinforcing detector response based on feature rhythm models.

In accordance with an aspect of the invention, each video segment in a plurality of video segments is annotated with an indicator of the likelihood that the respective video segment shows a particular feature. The plurality of video segments forms an episode of interest from a given video domain. Initial feature probabilities are calculated for respective ones of the plurality of video segments using a machine learning algorithm. Each initial feature probability indicates the likelihood that its respective video segment shows the particular feature. Refined feature probabilities are determined for respective ones of the plurality of video segments by finding the most probable state sequence in a finite state machine (FSM). This is accomplished at least in part using the determined initial feature probabilities. Finally, each of the video segments in the plurality of video segments is annotated with its respective refined feature probability.

In accordance with one of the above-identified illustrative embodiment of the invention, transition probabilities for a particular feature in a given video domain are determined by applying an n-th order Markov dependency to the manner in which the particular feature is shown in training episodes from the given video domain. These transition probabilities are used to populate a FSM. Next, a machine learning algorithm is used to determine an initial estimate of the probability that the given feature is shown in each video segment in an episode of interest from the given video domain. These initial feature probabilities are applied to the FSM using a Viterbi algorithm to determine the most probable state sequence. The video segments in the episode of interest are then annotated with refined feature probabilities based on the determined most probable state sequence in the FSM.

Advantageously, the above-identified embodiments of the invention may substantially improve the precision with which visual features are detected in video segments, especially for those visual features that express strong feature rhythms.

These and other features and advantages of the present invention will become apparent from the following detailed description which is to be read in conjunction with the accompanying drawings.

DETAILED DESCRIPTION OF THE INVENTION

1. Illustrative Embodiments

The present invention will be described with reference to illustrative embodiments that are in accordance with aspects of the invention. It should be recognized, however, that numerous modifications can be made to these embodiments and the results will still come within the scope of the invention. No limitations with respect to the specific embodiments described herein are intended or should be inferred.

Conventional video segment labeling with feature probabilities typically assumes the temporal independence of video segments in a given episode. In other words, when determining what visual features a particular video segment shows, the particular video segment is considered in isolation without regard to its video domain or its temporal relationship to other video segments. Nevertheless, the temporal order of an episode is significant and may give exploitable cues for more accurate labeling of its constituent video segments. For example, episodes in the news, drama, and comedy video domains tend to display an "alternation" feature rhythm. This means that visual features in episodes in these video domains tend to reappear every other video segment. Episodes from other video domains may show other feature rhythms such as repetition (i.e., the same visual feature appears in sequential video segments) and randomness (i.e., visual features tend to not be shown more than once in video segments that are temporally close to one another).

There are several reasons to expect feature rhythms in episodes from particular video domains such as video news. There are, for example, known limits on human visual information processing that tend to bias the selection and editing of video segments so that a particular visual-temporal "texture" is preserved throughout an episode. Furthermore, the economics of video production tend to limit editorial freedom resulting in the reuse of nearly identical video segments that show the same visual features.

As a result, it becomes possible to use feature rhythm models that describe the manners in which visual features typically recur in episodes from different video domains to improve precision in the automatic annotation of video segments with feature labels.

Figure 1:
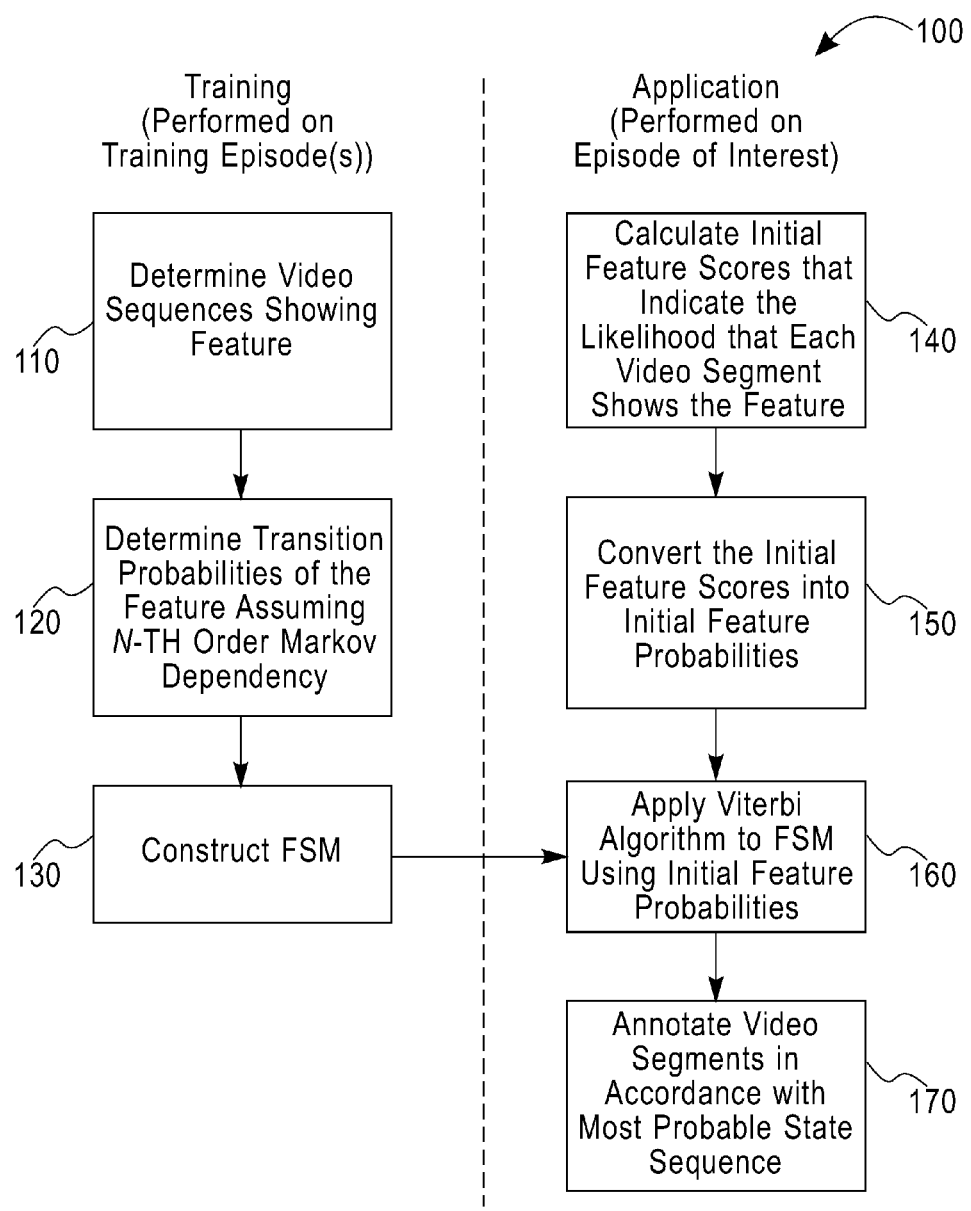
FIG. 1 shows a flow diagram describing a method in accordance with aspects of the invention for annotating visual features in an episode.

FIG. 1, for example, shows a flow diagram of an illustrative method in accordance with aspects of the invention for annotating video segments with the probability that they show a particular visual feature (e.g., "Building"). These video segments are part of an episode of interest from a given video domain (e.g., video news). The method may be divided into two portions: a training portion and an application portion. The training portion is performed on video segments belonging to one or more training episodes from the given video domain. The application portion of the method is performed on the episode of interest for which automatic annotation is desired. Each one of these portions will be described in turn.

Step 110 in the method 100 comprises determining those video segments in the training episodes that show the particular visual feature. This may be performed manually by one or more persons who view the training episodes and make judgments as to where the particular visual feature is shown. Alternatively, an automatic method may be used to find the particular visual feature in the training episodes. Nonetheless, unless the automatic method demonstrates high precision for the particular visual feature (e.g., greater than about 95%), it may be preferable that any automatic method applied to the training episodes be confirmed manually.

In step 120, transition probabilities for the particular visual feature are determined so that a FSM describing the temporal recurrence of the visual feature in the training episodes can be constructed. Such transition probabilities may be determined by assuming that the particular visual feature recurs in the training episodes with an n-th order Markov dependency. The order n may be any integer, although, as a practical matter, the higher the order, the more computational resources are required to perform the method, and, at some value, it may become a question of diminishing returns. Visual features that demonstrate a repetition feature rhythm may, for example, be determined using just a first-order Markov dependency. In contrast, features that demonstrate an alternation feature rhythm would require an order greater than one. A third-order Markov dependency is preferable because it is able to detect both repetition and alternation while also more clearly distinguishing these rhythms from noise in the training episodes. Noise may occur as a result of sporadic insertions and deletions of video segments. Such insertions and deletions may be present if, for instance, several training episodes are strung together to form a single episode of sufficient size to facilitate adequate statistics. Nonetheless, this preference for a given order of the Markov dependency is not intended to limit the scope of the invention.

Figure 2:
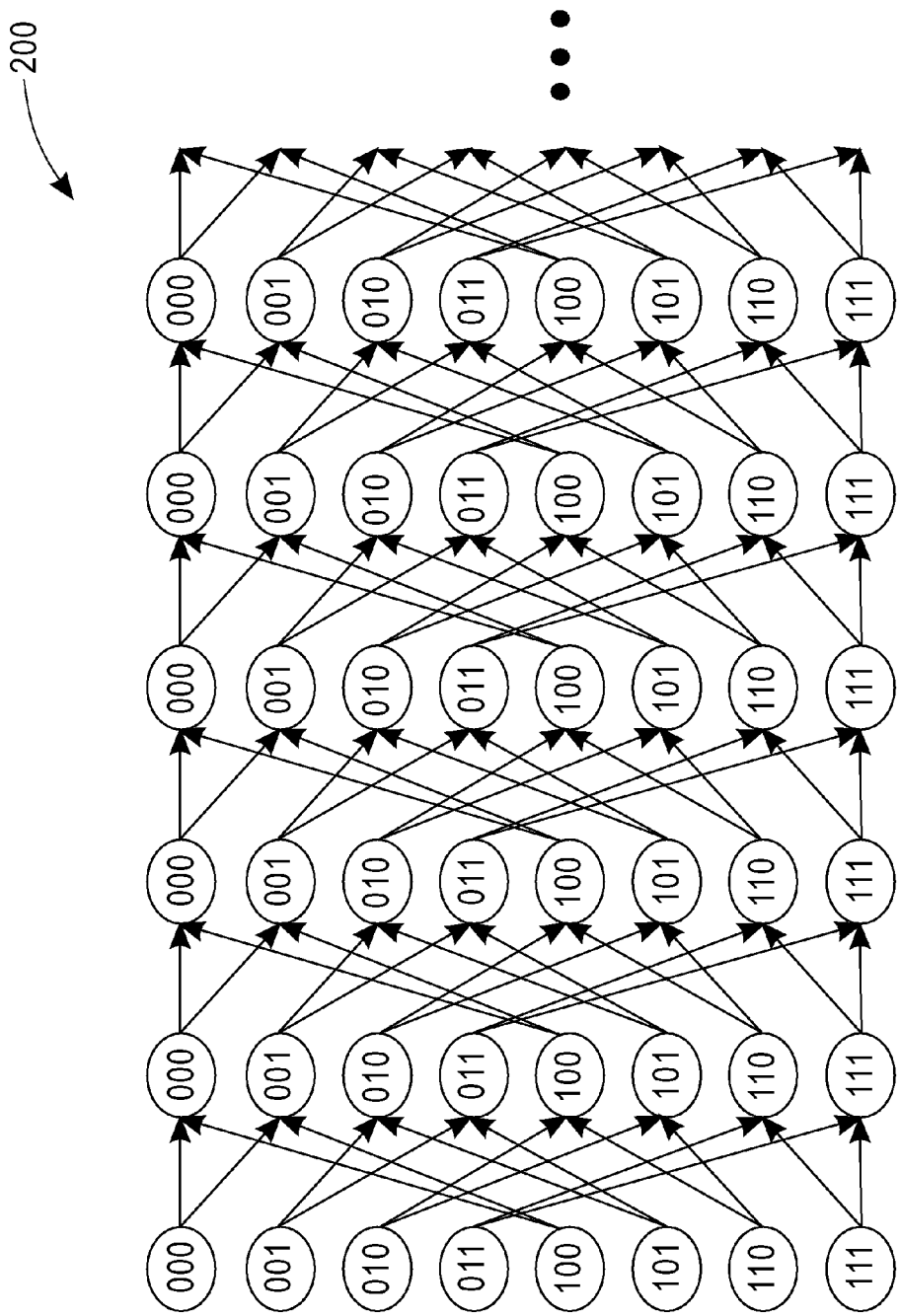
FIG. 2 shows an illustrative FSM in the FIG. 1 method.

In step 130, a FSM is populated with the transition probabilities determined in step 120. FIG. 2, for example, shows a FSM 200 based on the application of a third-order Markov dependency to the training episodes. Each state (oval) in the FSM corresponds to a video segment and is represented by a sequence of ones and/or zeroes ("1" indicating that the feature is shown, and "0" indicating that the feature is absent). The last place in the sequence indicates whether the particular visual feature is shown in the present video segment, while the first two places indicate whether the visual feature was shown in the prior two video segments. Therefore, the sequences "010" and "101" suggest a visual feature with an alternating feature rhythm, while the sequences "000", "011", "100" and "111" suggest repetition from the immediately prior state. The transitions from state to state in the FSM occur along the arrows. Each transition has an associated transition probability which is not explicitly shown in the figure.

With the FSM 200 populated, the application portion of the method 100 may be started. In step 140, initial feature scores are calculated for each video segment in the episode of interest. The initial feature scores indicate a first approximation of the likelihood that each video segment shows the particular feature. The scores for the video segments may be determined using any one of several well known machine learning algorithms. For example, the scores can be determined based on Neural Networks, Bayesian Networks, Support Vector Machines (SVMs), combinations of these algorithms, or any other suitable classification methodologies. Neural Networks, Bayesian Networks, and SVMs will be familiar to one skilled in the art. Moreover, they are described in a number of readily available references including, for example, U.S. Pat. No. 6,327,581 to Platt, entitled "Method and Apparatus for Building a Support Vector Machine Classifier," which is incorporated herein by reference.

Typically, the higher the initial feature score provided by the above-identified classification methodologies, the higher the probability that the particular visual feature is shown. Nonetheless, these scores tend be non-linear and based on method-dependent scoring systems. SVMs, for example, return for each video segment a score, s, which measures the hyperspace distance of the input video segment vector from the hyperplane decision boundary. SVMs are calibrated so that a score of $s=+1$ occurs at the positive margin and a score of $s=-1$ occurs at the negative margin. Monotonically increasing scores indicate monotonically increasing certainties of feature detection. It is therefore preferable that these scores be converted into initial feature probabilities, as indicated in step 150.

Platt, "Probabilistic Outputs for Support Vector Machines and Comparisons to Regularized Methods," in P. J. Bartlett et al., Editors, *Advances in Large Margin Classifiers*, MIT Press, October 2000, pp. 61-74 (incorporated herein by reference), provides a method of converting SVM scores into initial feature probabilities. This method fits these scores to a two-parameter family of curves, $1/(1+\exp(As+B))$, that intuitively capture a common probability measure. B. Zadrozny et al., "Transforming Classifier Scores into Accurate Multiclass Proabability Estimates," *Proceedings of the ACM International Conference on Knowledge Discovery and Data Mining (KDD '02)*, July 2002, pp. 694-699 (incorporated herein by reference), provides an alternative method. Both of these methods, as well has others, are commonly used and will be familiar to one skilled in the art.

Figure 3:
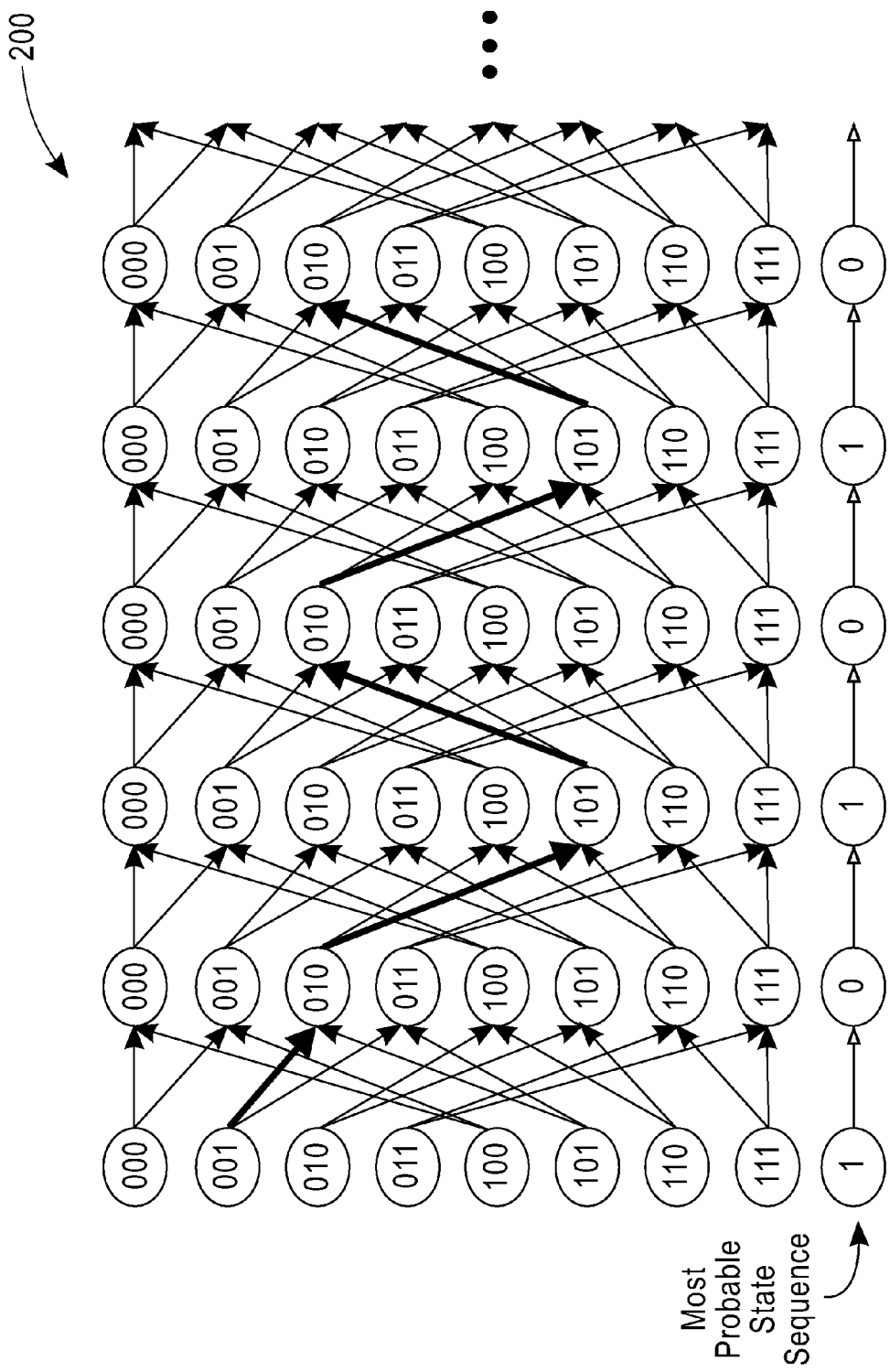
FIG. 3 shows the FIG. 2 FSM with the most probable state sequence marked.

Once the initial feature probabilities are available from step 150, they may be applied as incoming probabilities to the FSM 200 in step 160 using a conventional Viterbi Algorithm, or other similar methodology, to determine the most probable state sequence in the FSM. Application of a Viterbi Algorithm in this fashion will be familiar to one skilled in the art. The determination of the most probable state sequence in the FSM yields both refined feature probabilities for each of the video segments in the episode of interest as well as binary indications of which video segments show the particular feature. FIG. 3 shows the results of such a process with the most probable state sequence in the FSM indicated by bold arrows. In this particular case, the most probable state sequence in its binary form is "101010 . . . ," meaning that, of the six video segments explicitly shown in the figure, the first, third and fifth video segments are determined by the most probable state sequence to show the particular feature.

Finally, to complete the illustrative method 100, each video segment in the episode of interest may be annotated in step 170 with its refined feature probability and/or its binary designation as determined by the most probable state sequence.

Advantageously, the refined feature probabilities determined using the above-described method embodiment 100 may be substantially more precise than those that depend on raw machine learning algorithm scores alone (i.e., the initial feature probabilities). This may occur because the present method leverages information available from feature rhythm models. As described above, these models allow the video segments to be analyzed with context information and, therefore, not in temporal isolation.

Figure 4:
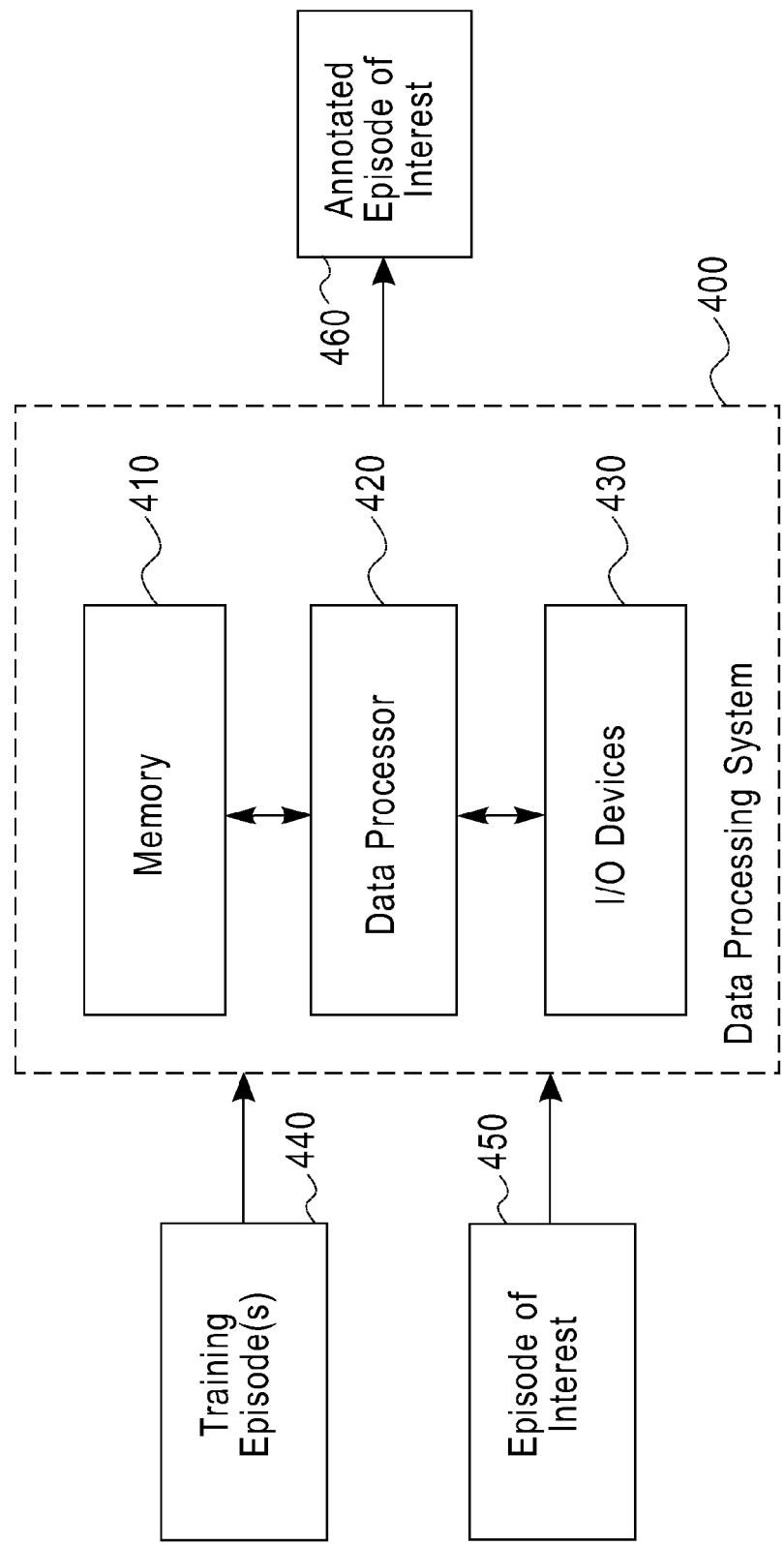
FIG. 4 shows a block diagram of a data processing system in accordance with aspects of the invention.

Because of the calculation-intensive nature of the illustrative method 100, it is preferably implemented using one or more data processing systems. The one or more data processing systems may comprise, for example, one or more personal computers, mainframe computers, or other types of data processing apparatus. Moreover, the data processing system may be located in a single location or be part of a distributed network. FIG. 4 shows an illustrative data processing system 400 in accordance with aspects of the invention. The data processing system comprises a memory 410, a data processor 420, and input/output (I/O) devices 430. Training episodes 440 are provided to the data processing system, allowing the system to perform the data processing tasks related to the training portion of the method. In addition, an episode of interest 450 is provided to the data processing system, so that the system can perform the application portion of the method. An annotated episode of interest 460 is provided by the data processing system as part of the system's output.

It should be noted that a data processing system in accordance with aspects of this invention need not necessarily perform the training portion of the method 100 itself. Rather, it is also possible, that a FSM comprising transition probabilities may be provided to the data processing system from an external source, leaving the data processing system to only perform the application portion of the method. It is contemplated, for example, that the training portion of the method need not be repeated for each episode of interest, but once completed, could be utilized again and again for all episodes of interest falling within the same video domain as the training episodes used to form the FSM.

Finally, it should be further noted that software programs that allow the data processing system 400 to function in a manner described above may be stored on various types of processor-readable storage media (e.g., magnetic disks, compact discs, digital versatile discs, etc.). Therefore, storage media containing such software programs would also fall within the scope of the invention.

2. Example of Application to Video News Domain

The application of the above-described illustrative method embodiment 100 to a sequence of video episodes in the video news domain will now be described. Nevertheless, while this particular application was directed at video news, it is easily extensible to any other video domain that shows recurrent feature rhythms. Candidate video domains include, but are not limited to, relatively short and possibly unedited reconnaissance and blog videos, as well as longer videos such as drama, comedy, sports, and documentary videos. Therefore, this particular example should not be interpreted as limiting the scope of the invention.

Figure 5:
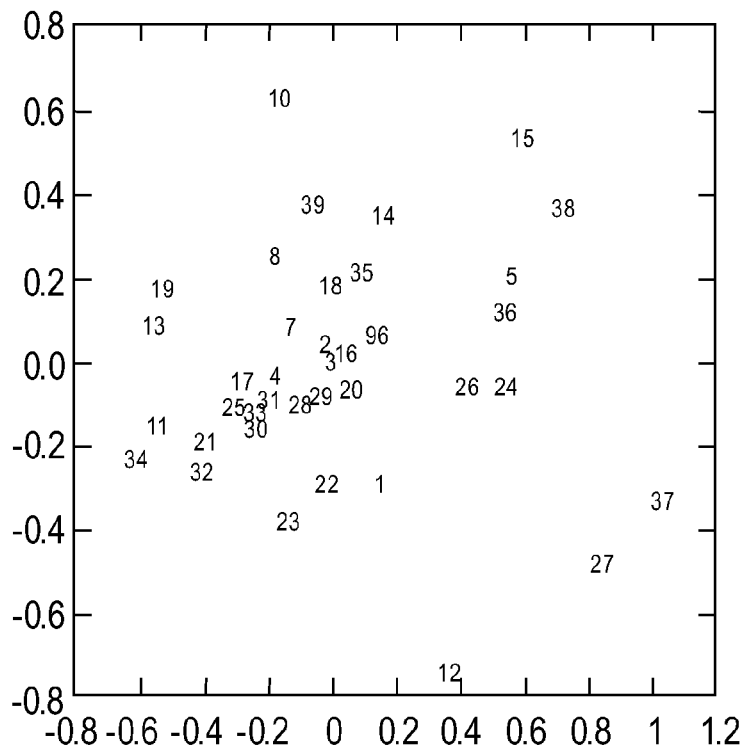
FIG. 5 shows a graph of the likelihood of visual features showing repetition or alternation feature rhythms.

Training was accomplished with video news episodes comprising 62,000 video segments that were manually annotated with feature labels from a 39-feature ontology. Many of the visual features in the training episodes displayed repetition or alternation feature rhythm patterns. As a result, it was decided to determine the states and transition probabilities for the training episodes assuming a third-order Markov dependency. FIG. 5 shows the location of the first two eigenvectors of the transition probability vectors of the 39 visual features as they are located in the two dimensional space of repetition (horizontal axis) and alternation (vertical axis). It is apparent that this space is a continuum and that most visual features are mixed. However, features describing backgrounds (e.g., "Weather" 37 and "Court" 27) tended toward repetition. Features describing human interactions (e.g., "Person" 15, "Face" 14, and "Meeting" 39) tended toward alternation.

After forming the FSMs for each of 39 visual features, SVMs were utilized for each of the visual features to score the video segments in an episode of interest. The episode of interest consisted of 6,500 video-segment-long episode of video news. The scores for the SVMs were then converted to probabilities using the method of Platt and applied to the FSM so that a Viterbi Algorithm could be used to refine the probability that each video segment showed each visual feature. Effectiveness of the method was measured by calculating AP for each visual feature, feeding the AP algorithm video segments from the episode of interest in a permuted order. More specifically, the AP algorithm was first fed only those video segments that had been detected as most probably showing the feature by application of the Viterbi Algorithm, and in order of their declining raw SVM scores. After these video segments were exhausted and, if it was still necessary, the remaining video segments were fed to the AP algorithm, again in declining score order.

Figure 6:
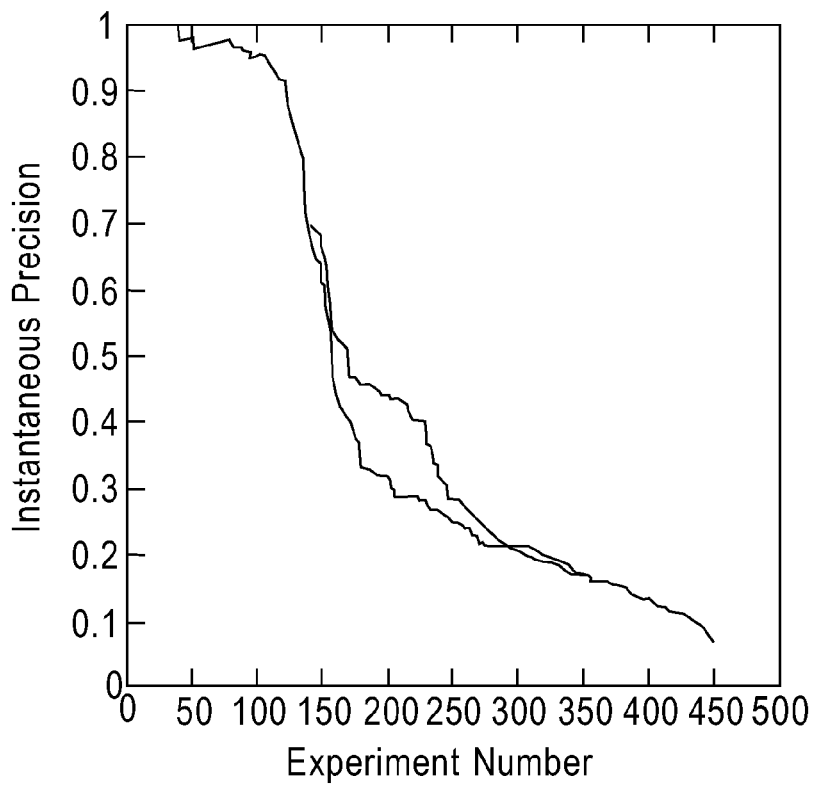
FIG. 6 shows a graph of instantaneous precisions for the visual feature "Sports."
Figure 7:
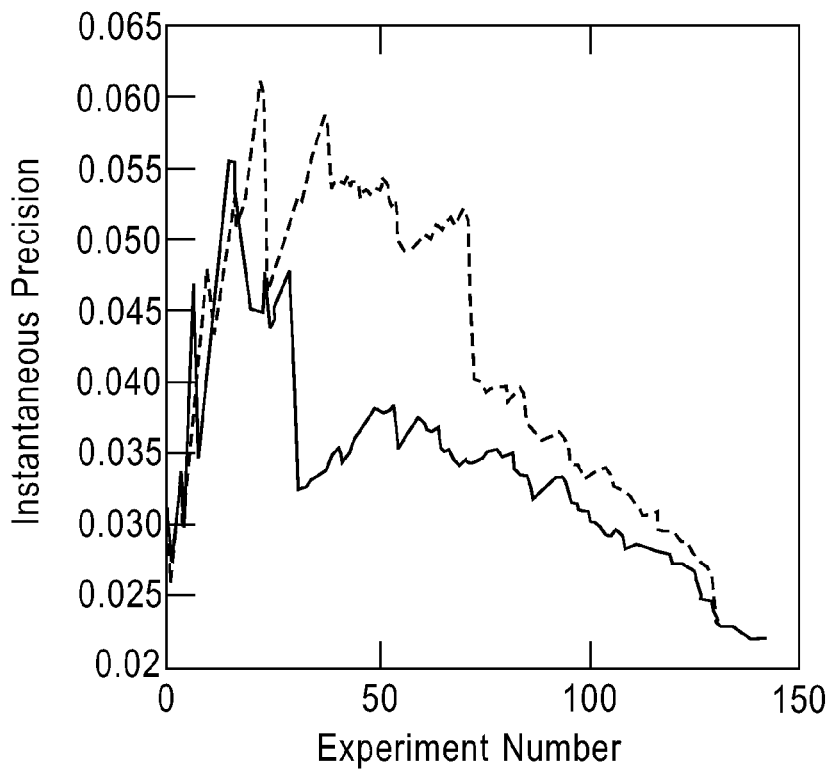
FIG. 7 shows a graph of instantaneous precisions for the visual feature "Corporate-Leader."
Figure 8:
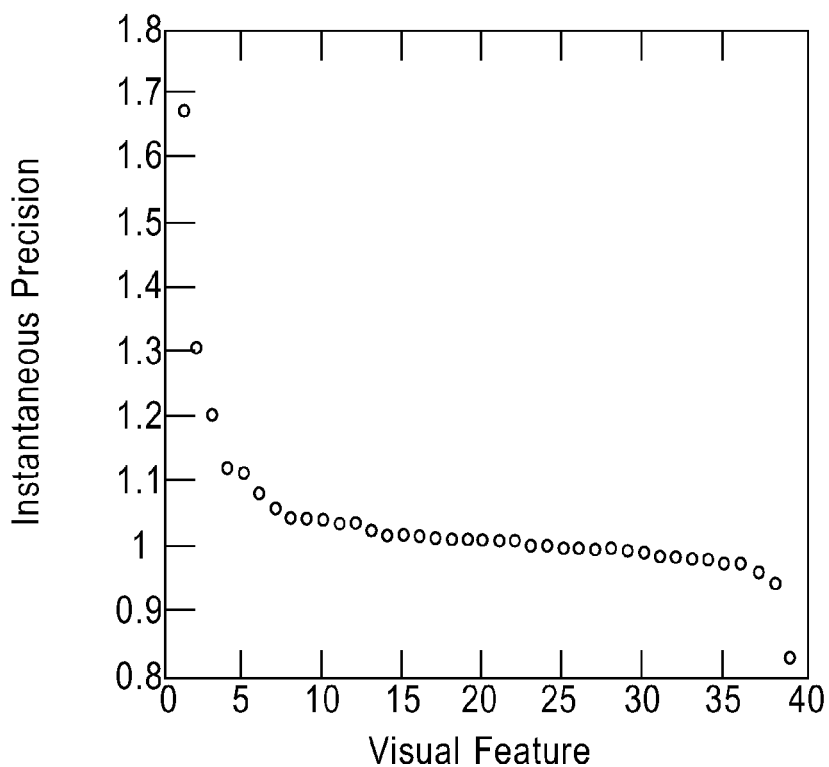
FIG. 8 shows the ratio between AP determined with the FIG. 1 method embodiment and AP determined with Support Vector Machine scores alone for 39 visual features.

FIGS. 6 and 7 show results from the application of the illustrative method 100 for the visual features "Sports" and "Corporate-Leader," respectively. In each case, instantaneous precision results derived from the illustrative method 100 form the upper data set while instantaneous precision results derived from raw SVM scores alone form the bottom data set. Finally, the change to AP resulting from the application of the illustrative method for all 39 visual features is shown in FIG. 8. In FIG. 8, the vertical axis shows the ratio between the AP achieved using the illustrative method and the AP achieved using SVM raw scores alone for each of the 39 visual features (sorted). Overall, the mean of AP (MAP) over all 39 features was 4%, above baseline MAP of 30% (i.e., MAP increased from about 30% to about 34% for the 39 features). In general, the more pronounced was a visual feature's feature rhythm, the more significant was the improvement in AP. The one and only striking failure in performance, showing a loss in absolute AP of 17%, was the "Computer/TV Screen" feature (shown as feature 39 in the graph), a rare feature which nevertheless showed high repetition in the training set due to an error of human labeling in the training portion.

It should again be emphasized that, although illustrative embodiments of the present invention have been described herein with reference to the accompanying figures, it is to be understood that the invention is not limited to those precise embodiments, and that various other changes and modifications can be made to these embodiments by one skilled in the art without departing from the scope of the appended claims.

What is claimed is:

1. A method of annotating each video segment in a plurality of video segments with an indicator of the likelihood that the respective video segment shows a particular feature, the plurality of video segments forming an episode of interest from a given video domain, the method comprising the steps of:
    determining initial feature probabilities for respective ones of the plurality of video segments using a machine learning algorithm, an initial feature probability for a given video segment indicating the likelihood that the given video segment shows the particular feature;
    determining refined feature probabilities for respective ones of the plurality of video segments, the refined feature probabilities determined by finding the most probable state sequence in a finite state machine comprising a plurality of states, a given state in the plurality of states specifying whether the particular feature is shown in each of two or more of the plurality of video segments, wherein the determined initial feature probabilities are applied as incoming probabilities to the finite state machine; and
    annotating each of the video segments in the plurality of video segments with the refined feature probability for the respective video segment.

2. The method of claim 1, wherein the machine learning algorithm comprises a Neural Network.

3. The method of claim 1, wherein the machine learning algorithm comprises a Bayesian Network.

4. The method of claim 1, wherein the machine learning algorithm comprises a Support Vector Machine.

5. The method of claim 4, wherein the step of determining initial feature probabilities for respective ones of the video segments comprises converting results derived from the one or more machine learning algorithms to probabilities.

6. The method of claim 1, wherein the particular feature belongs to a predetermined ontology of features.

7. The method of claim 1, wherein the finite state machine comprises a plurality of transition probabilities determined by applying an n-th order Markov dependency to a manner in which the particular feature is shown in one or more training episodes, the one or more training episodes from the same video domain as the episode of interest, and n being an integer.

8. The method of claim 7, wherein n is greater than one.

9. The method of claim 7, wherein n is equal to three.

10. The method of claim 1, wherein the step of determining the most probable state sequence in the finite state machine comprises applying a Viterbi Algorithm to the finite state machine.

11. The method of claim 1, wherein the given state has a corresponding representation comprising:
    at least a first portion indicative of whether the particular feature is shown in at least a first one of the plurality of video segments; and
    at least a second portion indicative of whether the particular feature is shown in at least a second one of the plurality of video segments.

12. The method of claim 1, wherein the given state has a corresponding representation comprising a plurality of bits, each of the plurality of bits being indicative of whether the particular feature is shown in a corresponding one of the plurality of video segments.

13. The method of claim 1, further comprising the step of detecting at least one of repetition of the particular feature and alternation of the particular feature.

14. The method of claim 1, wherein at least a first state in the plurality of states is associated with repetition of the particular feature and wherein at least a second state in the plurality of states is associated with alternation of the particular feature.

15. An article of manufacture comprising a non-transitory processor-readable storage medium storing one or more programs for annotating each video segment in a plurality of video segments with an indicator of the likelihood that the respective video segment shows a particular feature, the plurality of video segments forming an episode of interest in a given video domain, wherein the one or more programs, when executed by a data processing system comprising a memory and a processor coupled to the memory, cause the data processing system to perform at least the steps of:
    determining initial feature probabilities for respective ones of the plurality of video segments using a machine learning algorithm, an initial feature probability for a given video segment indicating the likelihood that the given video segment shows the particular feature;
    determining refined feature probabilities for respective ones of the plurality of video segments, the refined feature probabilities determined by finding the most probable state sequence in a finite state machine comprising a plurality of states, a given state in the plurality of states specifying whether the particular feature is shown in each of two or more of the plurality of video segments, wherein the determined initial feature probabilities are applied as incoming probabilities to the finite state machine; and
    annotating each video segment in the plurality of video segments with the refined feature probability for the respective video segment.

16. The article of manufacture of claim 15, wherein the finite state machine comprises a plurality of transition probabilities determined by applying an n-th order Markov dependency to a manner in which the particular feature is shown in one or more training episodes, the one or more training episodes from the same video domain as the episode of interest, and n being an integer.

17. The article of manufacture of claim 15, wherein the step of determining the most probable state sequence in the finite state machine comprises applying a Viterbi Algorithm to the finite state machine.

18. A data processing system comprising a memory and a data processor coupled to the memory for annotating each video segment in a plurality of video segments with an indicator of the likelihood that the respective video segment shows a particular feature, the plurality of video segments forming an episode of interest in a given video domain, wherein the data processing system performs the steps of:

determining initial feature probabilities for respective ones of the plurality of video segments using a machine learning algorithm, an initial feature probability for a given video segment indicating the likelihood that the given video segment shows the particular feature;

determining refined feature probabilities for respective ones of the plurality of video segments, the refined feature probabilities determined by finding the most probable state sequence in a finite state machine comprising a plurality of states, a given state in the plurality of states specifying whether the particular feature is shown in each of two or more of the plurality of video segments, wherein the determined initial feature probabilities are applied as incoming probabilities to the finite state machine; and annotating each video segment in the plurality of video segments with the refined feature probability for the respective video segment.

19. The data processing system of claim 18, wherein the data processing system receives at least a portion of the finite state machine from hardware external to the data processing system.

20. The data processing system of claim 18, wherein the finite state machine comprises a plurality of transition probabilities determined by applying an n-th order Markov dependency to a manner in which the particular feature is shown in one or more training episodes, the one or more training episodes from the same video domain as the episode of interest, and n being an integer.

* * * * *